United States Patent [19]
Birsching et al.

[11] Patent Number: 5,931,195
[45] Date of Patent: Aug. 3, 1999

[54] POWER STEERING APPARATUS FOR MOTOR VEHICLE WITH TWO PIECE INNER POLE MEMBER AND METHOD FOR MAKING THE SAME

[75] Inventors: Joel Edward Birsching, Unionville; Thomas Arthur Perry, Washington; Michael Paul Richardson, Midland, all of Mich.

[73] Assignee: General Motors Corporation, Detroit, Mich.

[21] Appl. No.: 08/936,367

[22] Filed: Sep. 24, 1997

[51] Int. Cl.⁶ ............................. B26D 5/09; B26D 5/083
[52] U.S. Cl. .................................. 137/625.23; 91/375 A; 180/422; 180/441
[58] Field of Search ........................... 335/279; 310/264, 310/265; 137/625.23; 91/375 A; 180/422, 428, 429, 441

[56] References Cited

U.S. PATENT DOCUMENTS

| | | | |
|---|---|---|---|
| 3,891,876 | 6/1975 | Herr et al. | 310/264 X |
| 4,454,801 | 6/1984 | Spann | 91/375 A |
| 4,871,040 | 10/1989 | Zuraski et al. | 180/142 |
| 4,886,137 | 12/1989 | Pawlak et al. | 180/142 |
| 5,038,063 | 8/1991 | Graber et al. | 310/115 |
| 5,046,573 | 9/1991 | Jones | 91/375 A X |
| 5,070,956 | 12/1991 | Pawlak et al. | 180/132 |
| 5,119,898 | 6/1992 | Eckhardt et al. | 180/142 |
| 5,253,729 | 10/1993 | Suzuki | 91/375 A X |
| 5,454,439 | 10/1995 | Birsching | 180/79.1 |
| 5,462,132 | 10/1995 | Tanke II et al. | 91/375 A X |
| 5,482,132 | 1/1996 | Birsching | 91/375 A X |
| 5,492,191 | 2/1996 | Birsching | 91/375 A X |
| 5,655,621 | 8/1997 | Birsching | 91/375 A X |
| 5,725,023 | 3/1998 | Padula | 180/422 X |
| 5,738,182 | 4/1998 | Birsching et al. | 180/422 |
| 5,763,976 | 6/1998 | Huard | 310/265 X |

Primary Examiner—John Rivell
Assistant Examiner—Meredith H. Schoenfeld
Attorney, Agent, or Firm—Robert M. Sigler

[57] ABSTRACT

A motor vehicle power steering gear has a proportional control valve with a cylindrical valve member riding rotatably on a spool shaft and connected thereto through a torsion bar. Electromagnetic apparatus for varying the magnitude of the effective restoring torque of the torsion bar comprises a stationary exciting coil, an inner pole member comprising an extension of the cylindrical valve member having a plurality of outwardly facing teeth and an outer pole member fixed on the spool shaft for rotation therewith and having an equal plurality of opposing inwardly facing teeth, the teeth defining an air gap axially beside the coil. The inner pole member comprises a hub member formed in an annular cylindrical configuration extending through the coil and made of a first magnetic material having a high magnetization for a given coil current for maximum flux through the coil, and further comprises a tooth member comprising the plurality of outwardly facing teeth and formed of a second magnetic material having a smaller magnetization than the first magnetic material for the given coil current but being more easily and inexpensively formed with the teeth. The first magnetic material may be a wrought or low carbon steel; and the second magnetic material may be sintered powdered iron.

4 Claims, 3 Drawing Sheets

POWER STEERING APPARATUS FOR MOTOR VEHICLE WITH TWO PIECE INNER POLE MEMBER AND METHOD FOR MAKING THE SAME

TECHNICAL FIELD

This invention relates to an automotive power steering apparatus having an electromagnetic control apparatus of the variable reluctance type for varying the driver steering effort required to produce a given level of power assist.

BACKGROUND OF THE INVENTION

U.S. Pat. No. 5,070,956 describes a hydraulic power assist steering system having conventional relatively rotatable spool and valve body elements coupled to a vehicle steerable wheel and a steering or hand wheel for regulation of a hydraulic steering assist boost pressure, a torsion bar creating a mechanical centering torque between the spool and valve body elements, and an integral electromagnetic mechanism which defines an additional coupling of variable resilience between the spool and valve body elements for adjusting driver steering effort required to produce a given level of power assist.

The integral electromagnetic mechanism comprises a stationary flux conducting element 136, rotary flux conducting elements 130, 132 supported for rotation with each of the spool and valve body elements and a stationary exciting coil disposed radially outside the rotary flux conducting elements and magnetically coupled thereto through the stationary flux conducting element to provide a flux path through the flux conducting elements and through air gaps therebetween. The rotary flux conducting elements each have an equal number of teeth projecting into the gap toward the other element to vary the reluctance of the air gap upon relative rotation. No permanent magnet is used.

When the exciting coil is energized with direct current, the teeth of each rotary element define electromagnetic poles which interact with the poles of the other element. The electromagnetic poles are oriented such that, when the spool and valve body elements are centered, with no torque in the torsion bar, the poles are radially aligned. This produces an attractive magnetic force between the poles and a positive magnetic centering torque when there is relative rotational displacement of the spool and valve body elements, which torque tends to restore the assembly to the centered position. The magnitude of the restoring torque depends on the magnitude of electric current provided through the exciting coil.

Structurally, one of the rotary elements is rotationally fixed to an inboard end of the spool element and the other, which circumferentially surrounds the one, is fixed to a pinion gear coupled to an inboard end of the torsion bar and the valve body element. This structure would provide four significant air gaps in the magnetic flux circuit were it not for the stationary flux conducting element, which reduces the number of significant air gaps to three. However, the stationary flux conducting element also provides a parasitic flux path between extension 140 and rotary flux conducting element 132, which path bypasses rotary flux conducting element 130 and which may significantly reduce the torque. The exciting coil is disposed circumferentially around the outermost of the rotary elements; and this increases the diameter of the housing, which must fit in a crowded engine compartment. There is an approximately 1:1 ratio between the circumferential width of the teeth and the spacing between the teeth on the rotary elements.

An improvement of the apparatus shown in U.S. Pat. No. 5,070,956 is found in the U.S. Patent application U.S. Ser. No. 08/687,077, U.S. Pat. No. 5,738,182, filed Jul. 17, 1996 by Birsching et al and assigned to the assignee of this application. In the improved apparatus, the external diameter of the apparatus is reduced by locating the relatively rotatable teeth of the variable reluctance type torque adjustment apparatus axially beside the exciting coil; and the smaller diameter housing fits more easily into a crowded engine compartment. The inner set of teeth is formed on an axial extension of the valve body projecting through the exciting coil; and the outer set of teeth is formed on a magnetic portion of an outer pole member having a non-magnetic portion mounted on the spool shaft. This provides three air gaps without requiring the stationary flux conducting element and thus eliminates a part and a parasitic flux path to decrease cost and increase peak restoring torque.

In this improved apparatus, the extension of the valve body bearing the inner teeth comprises sintered powdered iron, a material providing considerable manufacturing advantages for a part with a multiple toothed configuration but providing somewhat lower magnetization for a given magnetizing coil current than some other magnetic materials. The lower magnetization limits the maximum magnetic flux in the magnetic circuit and therefore the maximum magnetic field strength B produced in the air gap before saturation of the part and thus also limits the maximum torque output of the device for a given size. This problem is exaggerated in this particular part, since it passes through the coil, where the current generated H-field is highest, and is thus the part of the magnetic circuit closest to saturation. In addition, the cross-sectional area is small, due to the necessity of passing through the coil, and the flux path therein is also comparatively long. Each of these dimensional factors provides limits to the maximum magnetic flux achievable through the part. The use of available magnetic materials providing higher magnetization for the given magnetizing coil current, such as wrought steel, can increase output torque by as much as 33% but also tends to increase cost relative to the use of sintered powdered metal, due to the necessity of separately machining each tooth of the multi-tooth structure; while an increase in the cross-sectional area of the part increases both cost and package size.

SUMMARY OF THE INVENTION

The power steering apparatus of this invention is an improvement on that of the apparatus described above, the improved design providing increased torque from a small diameter package.

In the power steering apparatus of this invention, the extension of the valve body which forms an inner pole member for the apparatus is constructed differently from the similar extension of U.S. Ser. No. 08/687,077, U.S. Pat. No. 5,738,182. This inner pole member comprises two pieces: (1) a hub member affixed axially to the valve body for rotation therewith and extending through the electric coil and (2) a tooth member affixed on the hub member, extending radially outward therefrom along the outboard side of the electric coil, and ending in a first plurality of teeth extending radially outwardly and ending in tooth faces.

The hub member comprises an annular cylinder which extends the valve member through the coil. The hub member is made of a first magnetic material, preferably a wrought ferrous material such as wrought steel, that provides a high magnetization, and thus a magnetic field strength B, for a given coil current short of saturation. The hub member thus combines high magnetization in the critical portion of the magnetic circuit passing through the coil with a simple and regular shape which reduces machining and other working costs in manufacture.

The tooth member comprises a second magnetic material, preferably sintered powdered iron, which has a somewhat lower magnetization at the given coil current. In this member, which does not pass through the coil and provides a greater cross-sectional area for the magnetic flux, the balance shifts toward manufacturing considerations. The use of powdered iron permits less expensive formation of the multiple teeth, with minimal machining required after the tooth member is sintered. The two piece inner pole member provides at least 90% of the torque obtained from a single piece wrought ferrous member, without the additional manufacturing costs associated with the formation of teeth in wrought metal.

DESCRIPTION OF THE PREFERRED EMBODIMENT

Figure 1:
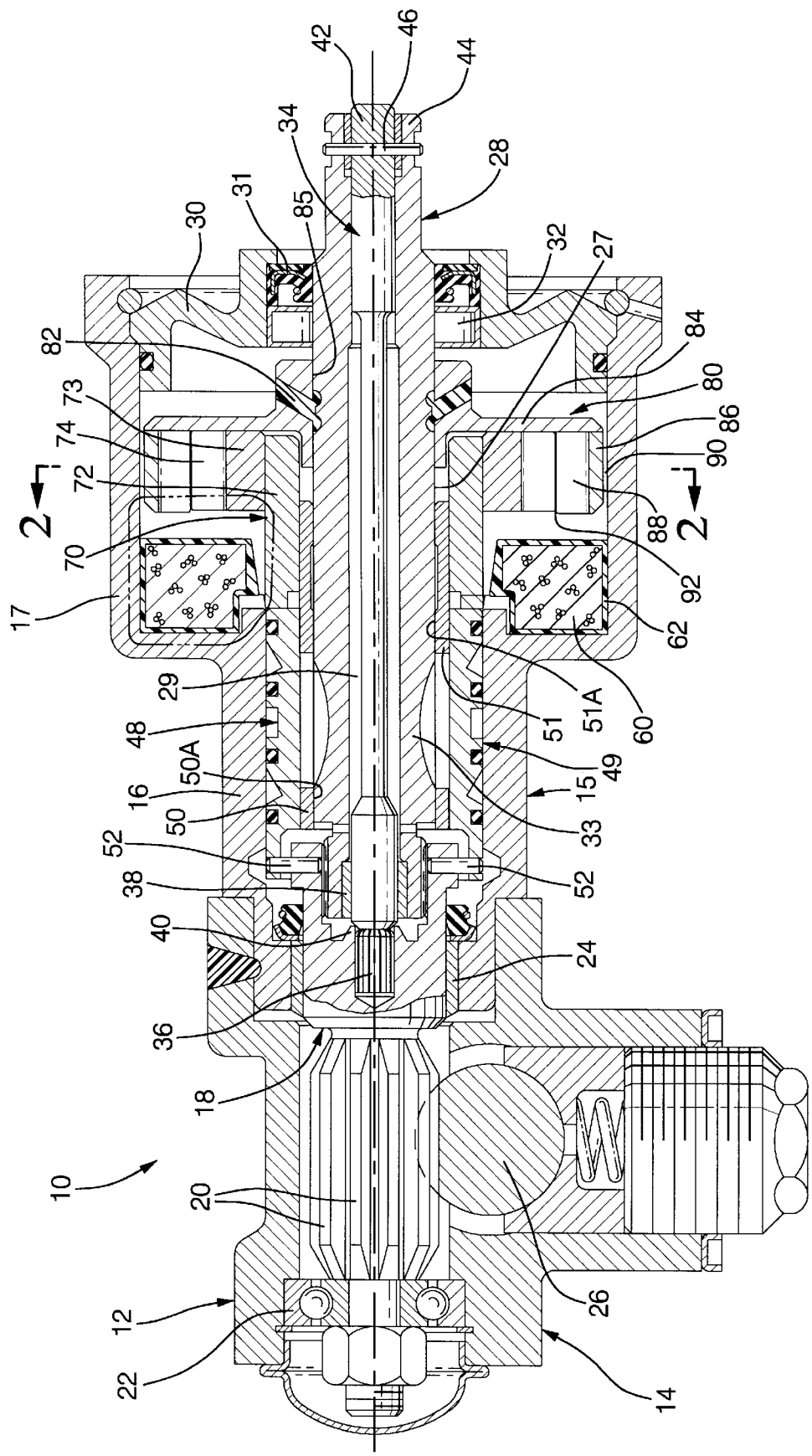
FIG. 1 is a longitudinal sectional view of a motor vehicle power steering gear according to this invention.

A variable effort motor vehicle power steering gear 10 according to this invention is disposed within a two piece housing 12 comprising a rack housing 14 and a generally cylindrical valve housing 15. A pinion head 18 having a plurality of gear teeth 20 thereon is rotatably supported in rack housing 14 by a roller bearing 22 at an outboard end and a sleeve bearing 24 at an inboard end. A rack bar 26 having a plurality of rack teeth meshing with the gear teeth 20 on the pinion head is supported in the rack housing 14 for movement perpendicular to the pinion head in response to rotation thereof. The ends, not shown, of rack bar 26 are connected to steerable wheels of the motor vehicle in a conventional manner.

Valve housing 15 has a small diameter portion 16 at an inboard end and a large diameter portion 17 at an outboard end thereof. A tubular spool shaft 28 of the steering gear protrudes into valve housing 15 through a cover 30 and annular fluid seal 31 on the outboard end thereof and extends through large diameter portion 17 and into small diameter portion 16. Spool shaft 28 is supported on cover 30 by a bearing assembly 32 and is provided with an internal axial bore 29. A proportional control valve in valve housing 15, similar to the valve described in U.S. Pat. No. 4,454,801, includes a torsion bar 34 within bore 29 of spool shaft 28. A serrated inboard end 36 of the torsion bar protrudes beyond a corresponding end 38 of the spool shaft within the small diameter portion of valve housing 15 and is force fitted in a bore at the bottom of a counterbore 40 in pinion head 18. An outboard end 42 of torsion bar 34 is connected to an outboard end 44 of spool shaft 28 by a pin 46. Outboard end 44 of spool shaft 28 is connected to a manual steering wheel, not shown, of the motor vehicle for rotation therewith as a unit. A lost motion connection in counterbore 40 allows twist (e.g. about 7 degrees) in torsion bar 34 and relative angular movement between pinion head 18 and spool shaft 28.

A cylindrical valve member 49 comprises a valve body 48 which surrounds a spool valve portion 33 of spool shaft 28 within small diameter portion 16 of valve housing 15 and is rotatably supported thereon by a pair of sleeves 50 and 51. A pair of radial pins 52 at the inboard end of valve body 48 fixes valve body 48, and thus cylindrical valve member 49, for rotation with pinion head 18, whereby cylindrical valve member 49 is coupled to the steerable wheels of the vehicle for rotation with steering rotation of the latter. Cylindrical valve member 49 is also coupled, via pins 52 and pinion head 18, with the inboard end of torsion bar 34. Torsional flexure of torsion bar 34 thus produces relative rotation between cylindrical valve member 49 and spool shaft 28; and this relative rotation opens and closes various orifices defined between cylindrical valve member 49 and spool shaft 28 to regulate the pressure of fluid from a power steering pump, not shown, to a steering assist fluid motor, also not shown. Details of the structure and operation of the fluid pressure regulation can be found in the prior art, including the previously mentioned U.S. Pat. Nos. 4,454,801 and 5,492,191; however, this structure and operation is merely background and environment; its precise nature is not relevant to the understanding of this invention, except to note that the more cylindrical valve member 49 is rotated, in either direction, from a center position wherein torsion bar 34 is unflexed, the greater will be the differential fluid pressure and consequent steering assist force in the corresponding direction.

The electromagnetic structure of power steering gear 10 comprises a coil 60 wound in an insulating bobbin 62 and retained in axial orientation at the inner end of large diameter portion 17 of valve housing 15. An inner pole member 70 is pressed onto sleeve 51 so as to form an outboard extension of valve body 48, with sleeves 50 and 51 rotatable on an outer cylindrical surface 27 of spool shaft 28. Outer pole member 80 is affixed by plastic injection 82 to outer cylindrical surface 27 of spool shaft 28 and rotates as one therewith. Thus, relative rotation between spool shaft 28 and cylindrical valve member 49 produces corresponding relative rotation between cylindrical valve member 49, with its extension comprising inner pole member 70, and outer pole member 80.

Figure 2:
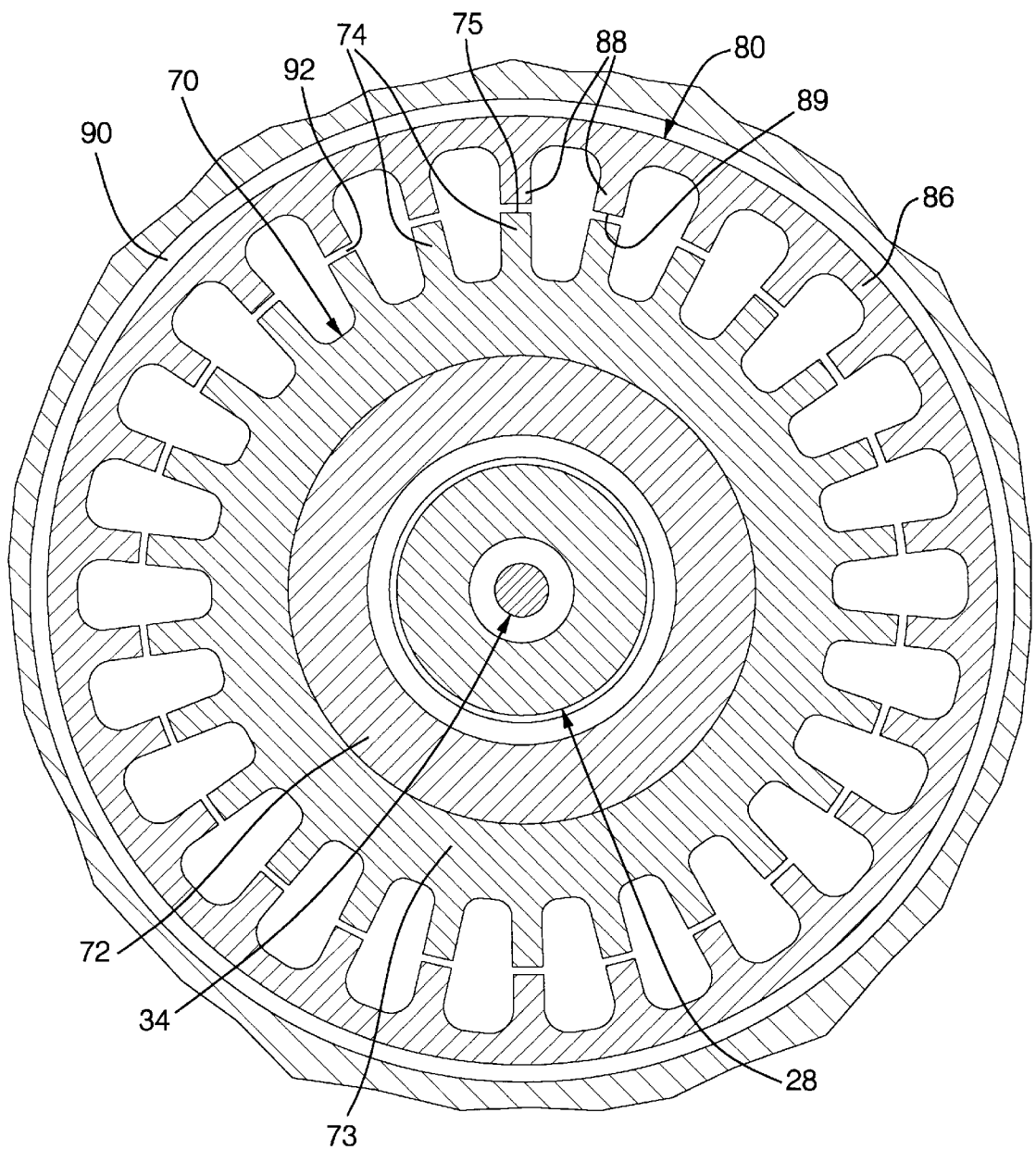
FIG. 2 is a section view taken along line 2—2 in FIG. 1 with no rotation between the inner and outer teeth.

Inner pole member 70 comprises a cylindrical annular hub member 72 extending axially in the outboard direction through coil 60 from valve body 48, to which it is coupled for rotation. Inner pole member 70 further comprises a tooth member 73, which is press fit onto the outboard end of annular hub member 72 and extends radially outward therefrom along the outboard side of coil 60 to end in a plurality (26 in this embodiment, although 24 may be preferred) of radially outwardly projecting teeth 74 disposed axially adjacent coil 60. Outer pole member 80 is provided with a non-magnetic hub portion 84 and a magnetic tooth portion 86. Hub portion 84 extends radially outward from spool shaft 28 on the outboard side of, and radially beyond, inner pole member 70; and tooth portion 86 extends axially toward coil 60 from the radially outer end of hub portion 84. As seen in FIG. 2, tooth portion 86 is positioned radially outward from, and around, tooth member 73 of inner pole member 70 and is provided with an identical plurality of projecting teeth 88, each of which is directed radially inwardly toward a corresponding one of radially outwardly projecting teeth 74. Each tooth 88 has a radial end circumferentially spanning substantially half or less the circumferential angle between that tooth and the next adjacent tooth 88 on either side of it; and similarly for teeth 74. In this embodiment, the teeth span a circumferential angle of about 4.5 degrees and are separated by an angle of about 9 degrees (10.5 degrees with 24 teeth). Teeth 88 are individually aligned with teeth 74 in the rotational position of inner pole member 70 and outer pole member 80 shown in FIG. 2, which corresponds to a center position of valve body 48 relative to spool shaft 28 in which no torque is exerted across torsion bar 34.

Valve housing 15 is made of a magnetic material such as malleable cast iron. Valve body 48 of cylindrical valve member 49 is made of a magnetic material such as steel. Hub member 72 is made of a first magnetic material having characterized by a high magnetization for a given magnetizing coil current, such as wrought steel (SAE 1010 or 1215) or low carbon steel. Tooth member 73 is made of a second magnetic material which is characterized by somewhat less magnetization but which can be easily and inexpensively formed with the required teeth. A suitable material is sintered, phosphorus powdered iron, which is also used for tooth portion 86 of outer pole member 80. Hub portion 84 of outer pole member 80 is made of a stiff, non-magnetic material such as stainless steel. Cover 30 is made of a non-magnetic material such as aluminum. A magnetic flux circuit is thus defined around coil 60 as shown by the dashed line through the large diameter portion 17 of the valve housing to the left and outside of coil 60 in FIG. 1, across a radially outer air gap 90 between valve housing 15 and tooth portion 86 of outer pole member 80, through tooth portion 86 and teeth 88, across the air gap 92 between teeth 88 and opposing teeth 74 of inner pole member 70 and through tooth member 74, hub member 72 and valve body 48 of cylindrical valve member 49 back to valve housing 15 through an air gap therebetween. Since hub portion 84 of outer pole member 80 and cover 30 are non-magnetic, there is no significant leakage flux therethrough bypassing the air gaps; and this concentrates the maximum flux generated by current in coil 60 across these air gaps.

The maximum amount of magnetic flux sustainable through a magnetic material is constrained by magnetic saturation; and the magnetic flux sustainable in a magnetic flux circuit is limited by the part of that circuit which is most constrained. Hub member 72 is formed as an annular cylinder which extends the magnetic flux circuit through coil 60. Due to the requirement of its passing through the small coil opening, the cross-sectional area available for magnetic flux is limited and the length of the flux path is comparatively long. These factors result in hub member 72 being a critical, flux limiting member of the magnetic circuit. Thus, the use of the first magnetic material for hub member 72 provides the highest practical magnetization for a given coil current in coil 60, so as to increase the maximum flux in the circuit and thus the maximum torque output of the apparatus. At the same time, the simple, annular cylindrical shape is comparatively easy and inexpensive to machine from a wrought steel or its equivalent.

Tooth member 73, however, provides a larger cross-sectional area and a shorter distance for the flux path. Therefore, the second magnetic material does not need as great a magnetization and may be picked for ease and low expense in tooth forming. Sintered powdered iron meets the requirements for the second magnetic material; and, even with tooth member 73 made of the second magnetic material, the apparatus with hub member 72 made of the first magnetic material provides at least 90% of the maximum torque output obtained from similar apparatus made with an inner pole member 70 made entirely of the first magnetic material, which is, in turn, about 33% greater than the maximum torque output obtained when the inner pole member 70 is entirely made of the second magnetic material.

Cylindrical valve member 49 is formed with inner pole member 70 as an axial extension in the following manner. Sleeves 50 and 51 are pressed into opposite axial ends of cylindrical valve body 48. Hub member 72 is machined into its annular cylindrical configuration from a piece of wrought steel or equivalent magnetic material with a high magnetization and pressed onto the outboard axial end of sleeve 51. Powdered iron is introduced into a suitably shaped mold cavity and pressed therein into the shape of tooth member 73 with teeth 74; and the resulting tooth member 73 is then sintered by heating in a known manner. Tooth member 73 is then axially pressed onto the outboard end of hub member 72 to complete inner pole member 70 as an extension of cylindrical valve member 49.

The electromagnetic structure of power steering gear 10 operates as a variable reluctance torque generator. There are no permanent magnets; and the only magnetic flux is that generated by an electric current provided through coil 60. This flux is concentrated in the magnetic material around the magnetic circuit described above, with low fringing and leakage flux. The radially outer air gap 90, between valve housing 15 and tooth portion 86 of outer pole member 80, does not vary significantly with relative rotation of the teeth. In addition, any other areas of increased reluctance, such as the boundaries between hub member 72 and valve body 48, do not vary with relative rotation of the teeth. These air gaps or other areas of increased reluctance are minimized by known design-techniques.

Figure 3:
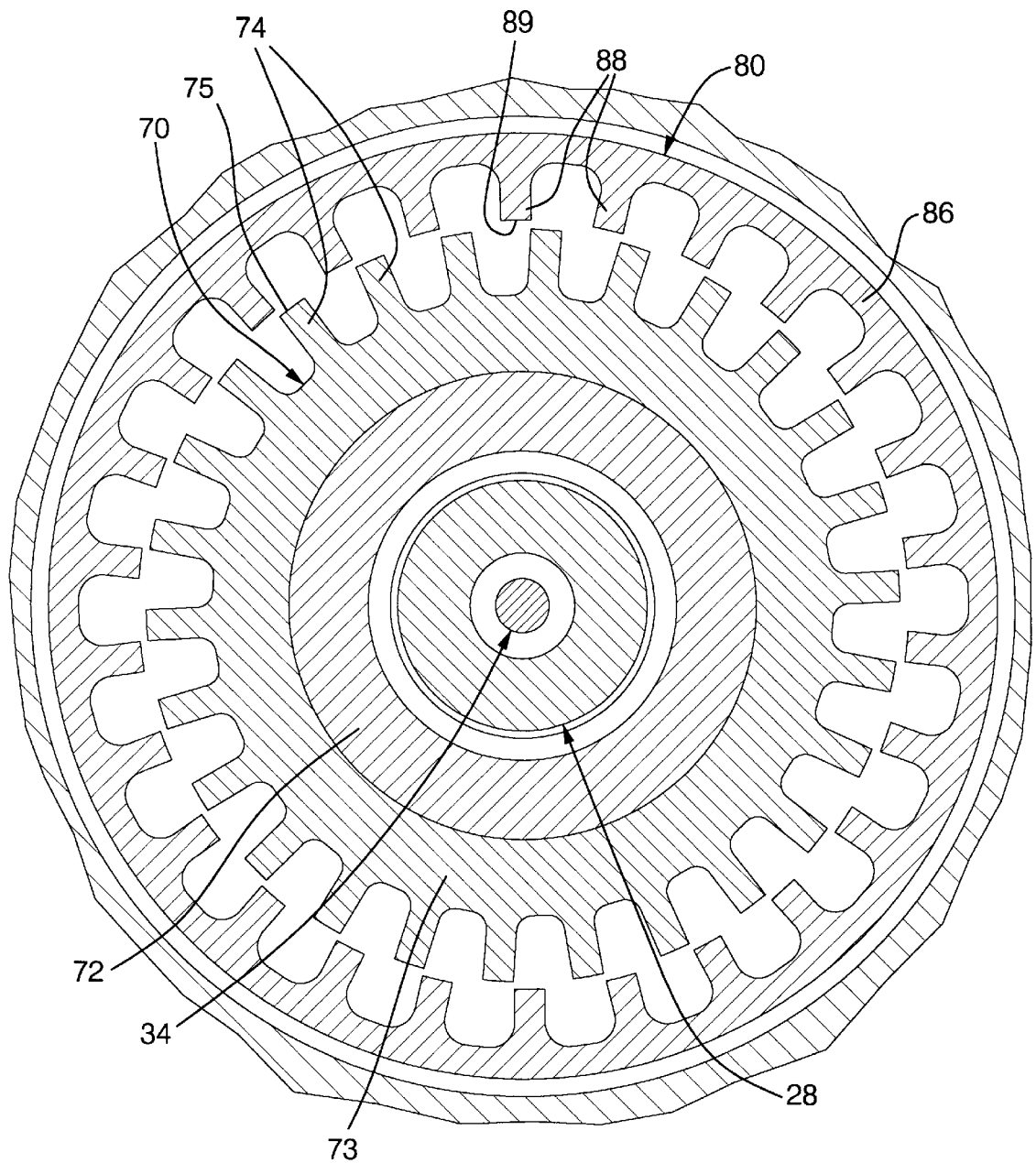
FIG. 3 is a section view taken along line 2—2 in FIG. 1 with a 4.5 degree rotation between the inner and outer teeth.

The air gap 92 between opposing faces 75 and 89 of teeth 74 and 88 comprises the plurality of parallel air gaps between opposing teeth 74 and 88; and this varies with relative rotation of the teeth. In the centered or zero torque relative position of spool shaft 28 and torsion bar 34, teeth 74 of outboard extension 70 are aligned with teeth 88 of pole member 80, as shown in FIG. 2. In this position, the air gaps between the teeth are minimized. FIG. 3 shows the teeth rotated relative to one another by 4.5 degrees. In this position, the radial ends of opposing teeth 74 and 88 have moved just beyond one another; and the air gaps therebetween, and the thus the total reluctance of the magnetic circuit, are effectively much larger. With a constant current in coil 60, a torque is generated between outboard extension 70 and outer pole member 80 which attempts to reduce the total reluctance; and this torque is a restoring torque which attempts to rotate the apparatus back toward the position of FIG. 2. The restoring torque increases with rotational angle from zero degrees of FIG. 2 to the 4.5 degrees of FIG. 3 since, with the 2:1 spacing between adjacent teeth, there is still a full tooth width distance between a tooth on one member and the next tooth in the direction of rotation on the other member and therefore little reduction in torque therefrom. The apparatus is designed to work entirely in this range from zero to 4.5 degrees rotation in each direction from the center position.

The maximum or peak restoring torque of the device with rotation is achieved with the smallest possible minimum air gap 92 between faces 75 and 89 of teeth 74 and 88, respectively. To control the critical air gap between teeth 74 and 88, members 50, 51, 48 and 70 are assembled into cylindrical valve member 49 as previously described before the faces of teeth 74 are machined to provide an accurately controlled radial dimension between radially inner surfaces 50A and 51A of sleeves 50 and 51, respectively, and the radially outer faces 75 of teeth 74; and a carefully controlled radial difference is thus obtained between tooth faces 75 and radially inner surfaces 50A and 51A. Cylindrical valve member 49 does not rotate with spool shaft 28 but rides on it by means of sleeves 50 and 51. The inner surfaces 50A and 51A of these sleeves are provided with a radial clearance of 0.006 mm (0.00025 inch) with respect to the outer radial surface of spool shaft 28 so as to allow non-binding relative rotation but form a liquid seal for the hydraulic fluid in the valve.

Outer pole member 80 is also formed into a single unit before the radially inner faces 89 of teeth 88 are machined; and this, along with its solid metal structure, produces a carefully controlled radial distance between these tooth faces and the radially inner surface 85 which is closely fitted on outer cylindrical surface 27 of spool shaft 28. Thus, since each of tooth faces 75 is at a carefully controlled radial distance from inner surfaces 50A and 51A of cylindrical valve member 49, each of tooth faces 89 is at a carefully controlled radial distance from inner surface 85 of outer pole member 80, and inner surfaces 50A, 51A and 85 are all adjacent a common outer cylindrical surface 27 of spool shaft 28, the radial distance between tooth faces 75 and 89 can be carefully controlled for a minimum air gap 92 therebetween, subject to the tolerances in the clearances between these surfaces. There is a clearance of 0.025 mm between outer pole member 80 and spool shaft 28 when they are fixed to each other; and the sum of this clearance and the 0.006 mm clearance between cylindrical valve member 49 and spool shaft 28 produces a total tolerance of 0.031 mm, which permits the minimum radial size of air gap 92 to be reliably controlled to the range of 0.127–0.204 mm (0.005–0.008 inch) for high peak torque capability.

The peak torque capability is further increased by the relative circumferential size and spacing of the teeth. For maximum effect, the angular circumferential width of a tooth should be about equal to the unidirectional rotational range of the apparatus from the center position, so that opposing inner and outer teeth just clear each other at the maximum rotation. Thus, the number of teeth will be inversely proportional to the desired spacing between them. It has been found that, for a given diameter of the air gap and angular rotational range, peak torque increases with the number of teeth, up to a maximum, and then falls. This maximum is reached when the teeth are sufficiently close together that a tooth starts interacting with more than one of the opposing teeth at once. Such multiple interactions reduce the total change in reluctance with relative rotation of the teeth. The tooth spacing/width ratio of this maximum has been found to be about 2:1. In the prior art, the tooth spacing is generally about as wide as the tooth width, for a ratio of 1:1. In such an arrangement, one of teeth 74, for example, would start to interact with a neighbor of the opposing tooth 88 before it completely cleared the opposing tooth 88; and the variation in reluctance would thus be reduced. At the 2:1 ratio, a tooth 74 is still a complete tooth width away from the neighbor of the opposing tooth 88 at the time the opposing tooth 88 is cleared; and the adjacent tooth interaction is minimal. The difference in reluctance between this rotational position and the center position is greater with no tooth interaction; and this produces a greater peak torque. At ratios greater than 2:1, no significant additional gain is achieved relative to adjacent tooth interaction. In addition, at ratios substantially greater than 2:1, more of the magnetic field is concentrated in each tooth, due to the smaller number; and saturation effects can decrease the peak torque.

Finally, since teeth 74 and 88 are radially rather than axially disposed relative to each other, magnetic forces between cylindrical valve member 49 and spool shaft 28 are radial and circumferential; and this minimizes axial loads therebetween.

We claim:

1. A vehicle power steering apparatus comprising, in combination:

a cylindrical housing made of a magnetic material and having a small diameter portion at an inboard end thereof and a large diameter portion at an outboard end thereof;

a spool shaft extending from the outboard end of the housing through the large diameter portion thereof and into the small diameter portion thereof and having an outboard end coupled to a vehicle steering wheel for rotation therewith, an internal bore and an outer cylindrical surface;

a torsion bar having an outboard end coupled to the outboard end of the spool shaft for rotation therewith and extending through the bore to an inboard end within the small diameter portion of the housing, the inboard end of the torsion bar being coupled to a vehicle wheel for steering rotation therewith;

a magnetic cylindrical valve member surrounding a spool valve portion of the spool shaft within the small diameter portion of the housing, the cylindrical valve member having an inboard end coupled to the inboard end of the torsion bar for rotation therewith and being rotatable relative to the spool valve portion of the spool shaft to vary valve openings therebetween for the metering of a power steering fluid assist boost pressure, the cylindrical valve member having a pair of axially separated internal sleeve portions riding on the outer cylindrical surface of the spool shaft with a radial clearance therebetween sufficiently small to allow relative rotation therebetween but form a hydraulic seal therewith;

an electric coil disposed at the inboard end of the large diameter portion of the housing;

an inner pole member affixed to an outboard end of the magnetic cylindrical valve member to form an axial extension thereof, the inner pole member comprising a hub member in an annular cylindrical configuration extending axially through the electric coil and a tooth member affixed to the hub member, extending radially outward therefrom along the outboard side of the electric coil, and ending in a first plurality of teeth extending radially outwardly and ending in tooth faces, the hub member further comprising a first magnetic material having a high magnetization for a predetermined current through the electric coil and the tooth member comprising a second magnetic material having a lower magnetization than the first magnetic material for the predetermined current in the electric coil; and an outer pole member having a non-magnetic hub portion affixed to the outer surface of the spool shaft for rotation therewith and extending radially outwardly on the outboard side of and radially beyond the tooth portion of the inner pole member and a tooth portion comprising a magnetic material and extending axially from the non-magnetic hub portion in the inboard direction toward the electric coil and between the first plurality of teeth and the large diameter portion of the housing, the tooth portion comprising a second plurality of teeth projecting radially inwardly toward the first plurality of teeth to form an air gap therewith in a magnetic circuit comprising the housing, cylindrical valve member, inner pole member and outer pole member surrounding the electric coil.

2. The vehicle power steering apparatus of claim 1 in which the first magnetic material is a wrought steel and the second magnetic material is sintered powdered iron.

3. The method of making a power steering valve apparatus of the type having a spool shaft with an outer cylindrical surface supported in a housing, a magnetic cylindrical valve member supported for relative rotation on the outer cylindrical surface of the spool shaft and connected thereto through a torsion bar, an inner pole member axially affixed to the magnetic cylindrical valve member for rotation therewith, an outer pole member affixed to the outer cylindrical surface of the spool shaft for rotation therewith and an electric coil disposed stationary within the housing, comprising the steps of:

forming the cylindrical valve member with a pair of internal sleeve surfaces adapted for forming hydraulic seals with the cylindrical outer surface of the spool shaft;

forming an inner hub member in a cylindrical configuration from a first magnetic material having a high magnetization for a predetermined current through the electric coil;

forming a tooth member from a second magnetic material having a lower magnetization than that of the first magnetic material for the predetermined current in the electric coil, the tooth member being formed in a cylindrical configuration with a plurality of radially outwardly directed teeth with radially outer tooth faces, the second magnetic material having a lower magnetization for the predetermined current in the electric coil but being formable into teeth at less cost than the first magnetic material;

affixing the inner hub member and the tooth member axially to an axial end of the cylindrical valve member to form the inner pole member as an axial extension of the cylindrical valve member for common rotation;

after formation of the cylindrical valve member with the inner pole member as an axial extension thereof, machining the radially outer tooth faces and assembling the cylindrical valve member on the spool shaft with the outer tooth faces of the tooth member axially beside the exciting coil;

forming the outer pole member with a non-magnetic hub portion having an inner mounting surface and a magnetic axial extension having a plurality of radially inwardly directed teeth having inner tooth faces corresponding with the outer tooth faces of the inner pole member;

after formation of the outer pole member, machining the inner tooth faces and assembling the outer pole member on the spool shaft with the inner tooth faces axially beside the exciting coil and aligned with the outer tooth faces; and fixing the outer pole member to the spool shaft with the inner tooth faces thereof and the outer tooth faces of the inner pole member aligned and a predetermined torque in the torsion bar, whereby the inner tooth faces and outer tooth faces form an air gap therewith in a magnetic circuit comprising the housing, cylindrical valve member, inner pole member and outer pole member surrounding the electric coil.

4. The method of claim 3 in which the first magnetic material is a wrought steel and the second magnetic material is a powdered iron which is sintered after the formation of the tooth member but before the machining of the outer tooth faces.

* * * * *